US008844779B2

(12) United States Patent
Cha et al.

(10) Patent No.: US 8,844,779 B2
(45) Date of Patent: Sep. 30, 2014

(54) STORAGE APPARATUS FOR VEHICLE

(75) Inventors: Dong Eun Cha, Seongnam-si (KR);
Seung Mok Lee, Hwaseong-si (KR);
Jeong Ho Lee, Suwon-si (KR); Yeong Sun Choi, Ansan-si (KR)

(73) Assignees: Hyundai Motor Company, Seoul (KR);
MS Autotech Co., Ltd., Gyeongju-Si (KR)

( * ) Notice: Subject to any disclaimer, the term of this patent is extended or adjusted under 35 U.S.C. 154(b) by 268 days.

(21) Appl. No.: 13/323,587

(22) Filed: Dec. 12, 2011

(65) Prior Publication Data

US 2013/0087591 A1      Apr. 11, 2013

(30) Foreign Application Priority Data

Oct. 5, 2011  (KR) .......................... 10-2011-0101154

(51) Int. Cl.
*B60R 5/04*      (2006.01)
*B60R 3/02*      (2006.01)

(52) U.S. Cl.
CPC .... *B60R 3/02* (2013.01); *B60R 5/04* (2013.01)
USPC .......................................... 224/491; 224/496

(58) Field of Classification Search
USPC ......... 224/496, 497, 510, 489, 490, 491, 488, 224/495, 504, 507, 924, 42.23; 293/117, 293/119; 414/462, 466; 296/37.1, 26.09
See application file for complete search history.

(56) References Cited

U.S. PATENT DOCUMENTS

| | | | |
|---|---|---|---|
| 2,490,014 A | 12/1949 | de Villiers Brand | |
| 2,545,269 A | 3/1951 | Ford | |
| 2,953,287 A | 9/1960 | Werner | |
| 4,089,554 A | 5/1978 | Myers | |
| 4,312,620 A | 1/1982 | Muschalek, Jr. | |
| 4,570,986 A | 2/1986 | Sams | |
| 4,676,415 A | 6/1987 | Kennedy | |
| 5,135,274 A | 8/1992 | Dodd | |
| 5,301,992 A * | 4/1994 | Whitmore | 296/37.1 |
| 5,823,585 A | 10/1998 | Tanguay | |
| 6,196,612 B1 * | 3/2001 | Grimes | 296/65.05 |
| 6,474,715 B2 | 11/2002 | Fukushima et al. | |
| 6,575,509 B1 | 6/2003 | Golden | |
| 6,644,707 B2 | 11/2003 | McLaughlin et al. | |
| 7,111,884 B2 * | 9/2006 | Johnson | 296/26.1 |
| 7,121,597 B2 | 10/2006 | Chuang | |
| 7,281,745 B1 | 10/2007 | Meinke et al. | |

(Continued)

FOREIGN PATENT DOCUMENTS

DE    195 38 734 A1    5/1996
DE    101 24 375 C1    11/2002

(Continued)

*Primary Examiner* — Justin Larson
*Assistant Examiner* — Phillip Schmidt
(74) *Attorney, Agent, or Firm* — Morgan, Lewis & Bockius LLP

(57) ABSTRACT

A storage apparatus for a vehicle may include a rear bumper having a back beam mounted under an inner space thereof, a storage case provided in a space above the rear bumper and drawn-out/drawn-in by being sled to the outside in the state in which a load is supported by the top of the back beam, and a bumper door rotatably provided on an end of the storage case so as to open and close the storage case and formed so that a portion exposed to the outside coincides with an outer surface of the rear bumper.

11 Claims, 4 Drawing Sheets

(56) References Cited

U.S. PATENT DOCUMENTS

| | | |
|---|---|---|
| 7,347,474 B2 | 3/2008 | Shagbazyan |
| 8,256,807 B2 | 9/2012 | Lucas |
| 8,302,829 B2 | 11/2012 | Lee et al. |
| 2002/0105201 A1* | 8/2002 | Melotik et al. ............. 296/26.09 |
| 2007/0102465 A1 | 5/2007 | Wezyk et al. |
| 2008/0006667 A1 | 1/2008 | Bergerhoff et al. |
| 2008/0179907 A1* | 7/2008 | Medlar et al. ................ 296/37.1 |

FOREIGN PATENT DOCUMENTS

| | | |
|---|---|---|
| JP | 2001-334879 A | 12/2001 |
| JP | 2007-245959 A | 9/2007 |
| JP | 4332827 B2 | 7/2009 |

* cited by examiner

STORAGE APPARATUS FOR VEHICLE

CROSS-REFERENCE TO RELATED APPLICATION

This application claims under 35 U.S.C. §119(a) the benefit of Korean Patent Application No. 10-2011-0101154 filed Oct. 5, 2011, the entire contents of which application is incorporated herein for all purposes by this reference.

BACKGROUND OF INVENTION

1. Field of Invention

The present invention relates to a storage apparatus for a vehicle capable of increasing a storage space by drawing-out an inner space of a rear bumper as a storage structure and more increasing a storage space by using the drawn-out rear bumper as a step and a bench and changing a structure of a drawn-out rear bumper.

2. Description of Related Art

FIG. 1 shows a vehicle in which a space of a trunk room 1 is provided with a storage case 2. The structure of the related art shown in FIG. 1 has a structrue opening a trunk lid 3 and drawing-out the storage case 2. In order to store stored goods, it is complicated to open the trunk lid an then, store the stored goods. In addition, when it is not easy to store the stored goods due to pollution or humidity of the space of the trunk room 1, the use of the trunk room 1 may be degraded.

Further, the storage structure of the related art shown in FIG. 2 has a structure in which a rear bump 11 is used as a door of the storage space 12. The storage structure has a structure in which the rear bump 11 is opened and then, an article 13 may be stored in a storage space 12 provided under the vehicle.

However, as shown in FIG. 2, the structure according to the related art has a structure using the rear bumper 11 as the door of the storage space 12. According to the structure of the related art shown in FIG. 1, an inner space of the rear bump 11 corresponding to a spare space is not used as the storage structure and thus, a storage function of the bumper is insufficient.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

Various aspects of the present invention provide for a storage apparatus for a vehicle capable of positively using a spare space of a vehicle by drawing-out an inner space of a rear bumper corresponding to the spare space as a storage structure and using the drawn-out rear bumper as a step and a bench.

In addition, various aspects of the present invention provide for a storage apparatus for a vehicle capable of increasing a storage space by changing a structure of a drawn-out rear bumper.

In various aspects, a storage apparatus for a vehicle includes a rear bumper having a back beam mounted under an inner space thereof, a storage case provided in a space above the rear bumper and drawn-out/drawn-in by being sled to the outside in the state in which a load is supported by the top of the back beam, and a bumper door rotatably provided on an end of the storage case so as to open and close the storage case and formed so that a portion exposed to the outside coincides with an outer surface of the rear bumper.

The storage case may include a support tray having storage space provided therein and slidably moves while being supported on the top of the back beam, and a tray cover provided in the bumper door and rotatably mounted to the support tray to open and close the support tray.

The storage apparatus for a vehicle may further include a plurality of link members having ends rotatably coupled to both sides of the tray cover and the other ends rotatably coupled to both sides of the support tray.

The tray cover may be integrally coupled with the bumper door.

The bumper door rotated to the rear of the vehicle together with the tray cover may be used as a step or a bench.

The storage apparatus for a vehicle may further include a guide bracket provided in the top space of the rear bumper in the state in which a portion of the storage case is covered and supported and mounted so as to be supported to the rear end panel and the back beam.

The bottom surface of the guide bracket may be mounted to be seated to the top end of the back beam, the front surface of the guide bracket may be mounted to be supported to the rear end panel, and the top portion of the guide bracket may be mounted to be support to the top portion of the rear bumper.

One end of the guide bracket may be provided with a stopper part to be bent downward to support the inside of the storage case at the time of drawing-out the storage case.

The other end of the guide bracket may be provided with a load support portion to extend backward so as to support the load of the storage case at the time of drawing-out the storage case.

The storage apparatus for a vehicle may further include a support bracket mounted to be fixed to the bottom surface of the load support portion and the rear surface of the back beam so as to support the load of the storage case.

The inner space in front of the rear bumper 10 may be provided with a rear floor panel, the rear floor panel may be provided with a guide rail mechanism, and the top portion of the guide rail mechanism may be mounted with the storage case to be mounted above the back beam.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain embodiments thereof illustrated in the accompanying drawings which are given hereinbelow by way of illustration only, and thus are not limitative of the present invention, and wherein:

FIG. 4 is a diagram showing a structure in which a bumper door is opened, in the state in which an exemplary storage case of the storage apparatus according to the present invention is drawn-in;

DETAILED DESCRIPTION

Figure 1:
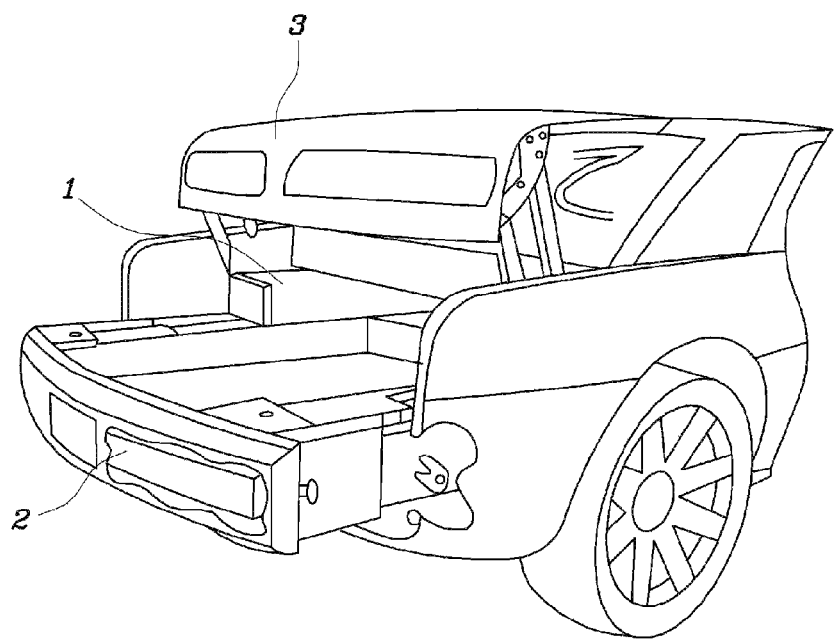
FIG. 1 is a diagram for describing a storage apparatus for a vehicle according to the related art.
Figure 2:
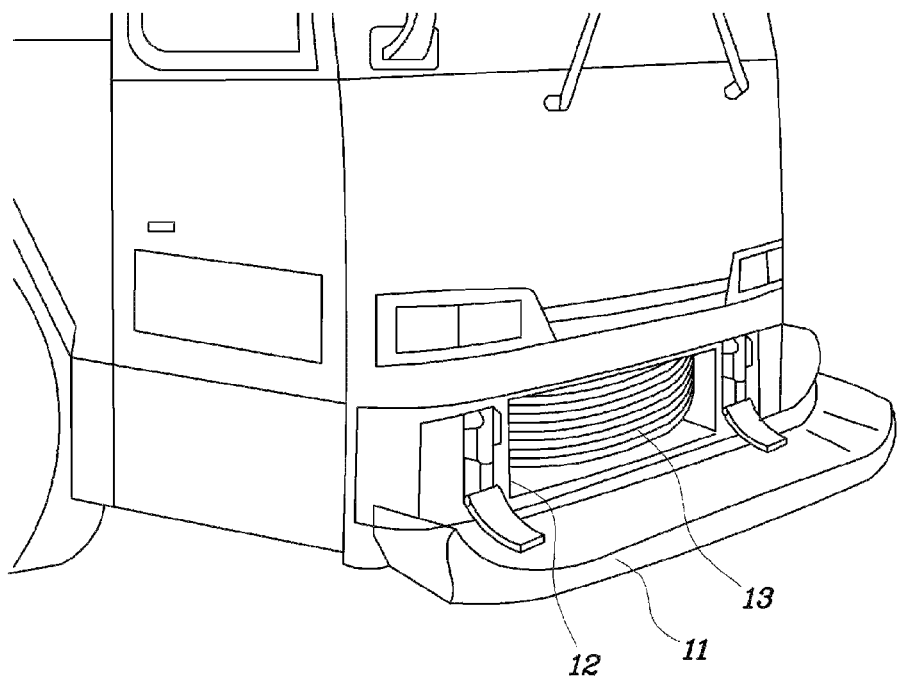
FIG. 2 is a diagram for describing another storage apparatus for a vehicle according to the related art.

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

As shown in FIGS. 3 to 8, a storage apparatus for a vehicle according to various embodiments of the present invention has a structure using an inner space of a rear bumper 10 of a vehicle corresponding to a spare space while a portion of the rear bumper 10 of a vehicle is drawn-out and drawn-in and a bumper door 25 is opened or closed. The storage apparatus for a vehicle is configured to include the rear bumper 10 having a back beam 11 mounted under the inner space thereof, a storage case 20 provided in a space above the rear bumper 10 and drawn-outdrawn-in by being sled to the outside in the state in which a load is supported by the top of the back beam 11, and a bumper door 25 rotatably provided on an end of the storage case 20 so as to open and close the storage case 20 and formed so that a portion exposed to the outside coincides with an outer surface of the rear bumper 10.

That is, the storage case 20 having the storage space 21 is mounted in the space provided above the rear bumper 10 and the storage space 20 in the vehicle is increased by drawing-out the storage case 20 to the outside while being supported above the back beam 11 and configuring the bumper door 25 mounted at the end of the storage case 20 so as to be opened and closed, thereby maximizing an article storage function.

As shown in FIGS. 3 to 6, the storage case 20 according to various embodiments of the present invention has a structure in which a support tray 22 has storage space 21 provided therein and slidably moves while being supported on the top of the back beam 11 and a tray cover 23 is provided in the bumper door 25 and rotatably mounted to the support tray 22 to open and close the support tray 22, thereby storing and accepting the articles in the storage space 21 provided above the support tray 22 at the time of drawing-out the storage case 20.

In addition, the storage case 20 may be opened by opening the bumper door 25 in the state in which the storage case 20 is drawn-out to further increase the storage case 21 by using the space above the support tray 22 and the space above the top surface of the bumper door 25 and as a result, the long article may also be loaded.

In this case, the support tray 22 serves to provide the storage space 21 in the drawing-out and drawing-in state and is not limited to a shape described herein. Therefore, the support tray 22 may be modified in several shapes so as to provide various types of storage spaces 21.

Further, the tray cover 23 and the bumper door 25 may be integrally coupled with each other so as to secure user convenience.

That is, when the bumper door 25 is rotated from the rear bumper 10 to the rear of the vehicle, the tray cover 23 is rotated together. Therefore, the user rotates the bumper door 25 and then, does not need to separately rotate the tray cover 23, thereby increasing the user convenience.

Various embodiments of the present invention have a structure in which a plurality of link members 24 are applied for the rotation operation of the tray cover 23. Various embodiments of the present invention have a structure in which one end of the link member 24 is rotatably coupled to both sides of the tray cover 23 through a hinge 24a and the other end of the link member 24 is rotatably coupled to both sides of the support tray 22 through a hinge 24b.

When the storage case 20 is opened by rotating the tray cover 23 backward, the front end of the tray cover 23 is stumbled by contacting the bottom end at which the hinge 24b is disposed at the link member 24 disposed at the rear thereof Therefore, an opened angle of the tray cover 23 may be controlled.

Figure 7:
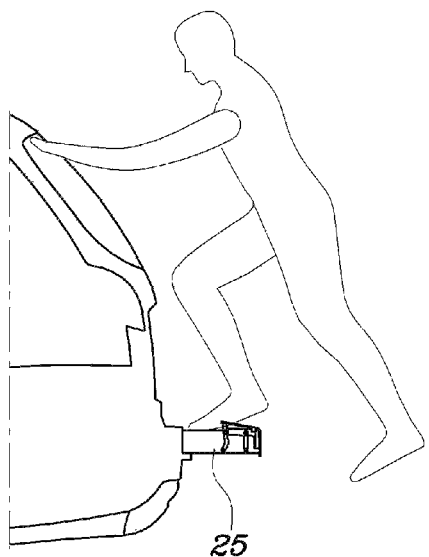
FIG. 7 is a diagram showing in an exemplary state in which the bumper door is used as a step at the time of opening the bumper door according to the present invention.
Figure 8:
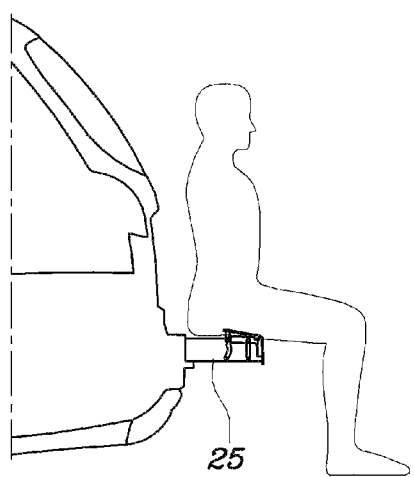
FIG. 8 is a diagram showing in an exemplary state in which the bumper door is used as a bench at the time of opening the bumper door according to the present invention.

As shown in FIGS. 7 and 8, in various embodiments of the present invention, the bumper door 25 rotated to the rear of the vehicle together with the tray cover 23 may be configured to be used as the step or the bench.

That is, one end of the bumper door 25 coincides with the top of the rear bump 10 and the other end of the bumper door 25 coincides with the bottom of the rear bump 10, such that the outside of the bumper door 25 is formed to coincide with the outside of the rear bumper 10.

Therefore, the bumper cover 25 is provided in the rear bumper 10 and the bumper door 25 is provided as a partial shape of the rear bumper 10 at the time of closing and the bumper door 25 is used as the step or the bench when drawing the bumper door 25 to the outside of the rear bumper 10. Meanwhile, articles may be used while being put on the opened bumper door 25.

Figure 5:
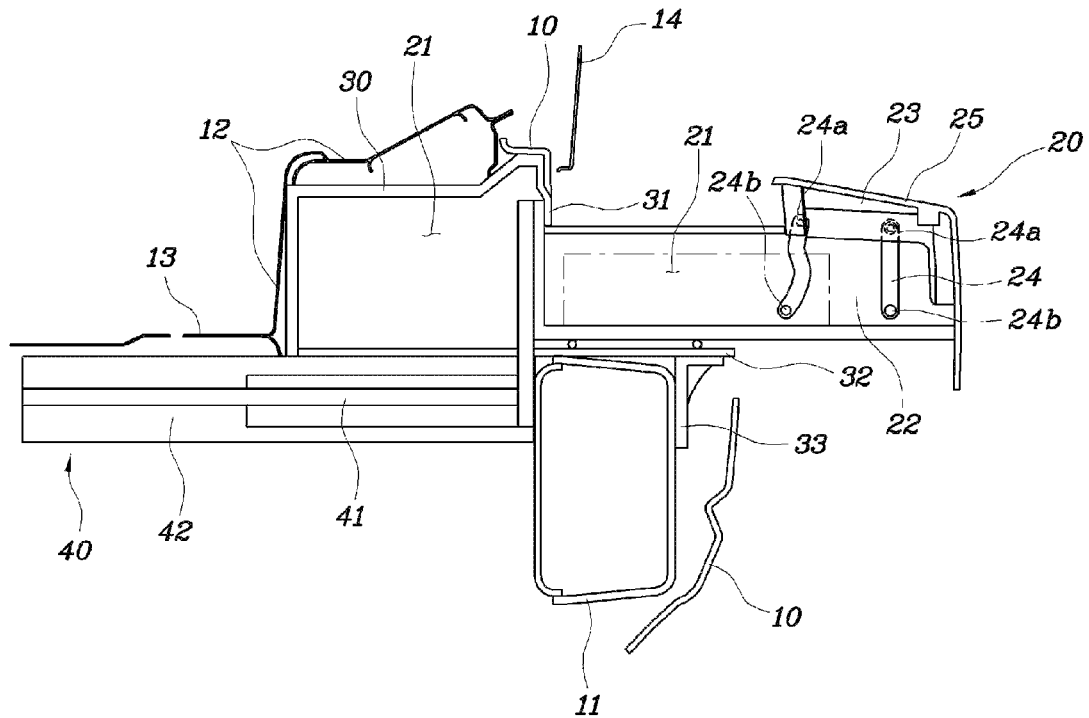
FIG. 5 is a diagram showing a storage case drawing-out structure of an exemplary storage apparatus according to the present invention.

In addition, as shown in FIG. 5, the inner space of the tray cover 23 is provided so as to communicate with the storage space 21, such that the articles at the time of closing the bumper door 25 may be stored in the storage space 21 and the space provided in the tray cover 23, thereby further increasing the storage space 21.

Figure 3:
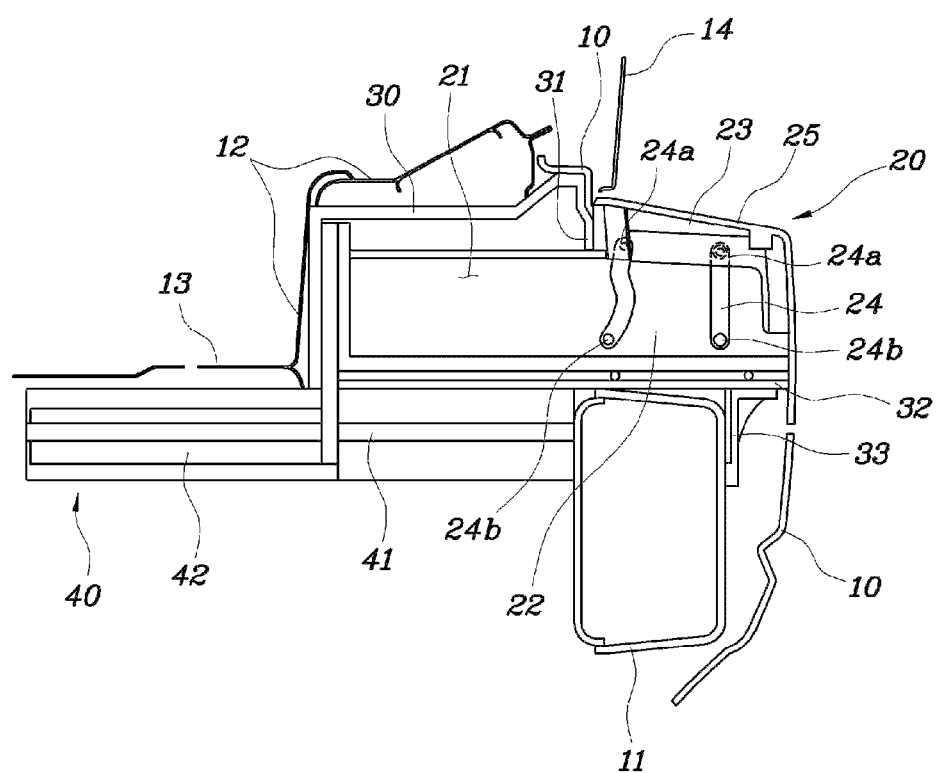
FIG. 3 is a diagram showing a storage case drawing-in structure of an exemplary storage apparatus according to the present invention.

As shown in FIGS. 3 and 5, in various embodiments of the present invention, a guide bracket 30 is provided in the top space of the rear bumper 10 in the state in which a portion of the storage case 20 is covered and supported and the guide bracket 30 is mounted so as to be supported to the rear end panel 12 and the back beam 11.

The bottom surface of the guide bracket 30 is mounted to be seated to the top end of the back beam 11, the front surface of the guide bracket 30 is mounted to be supported to the rear end panel 12, and the top portion of the guide bracket 30 is mounted to be support to the top portion of the rear bumper 10 mounted under a trunk lid 14.

That is, the guide bracket 30 is simultaneously fixed to the rear end panel 12 and the back beam 11, thereby supporting the load applied to the storage apparatus by the drawing-out operation at the time of drawing-out the storage case 20.

In this configuration, the storage case 20 is sled to the inside of the guide bracket 30 so as to be drawn-out and drawn-in. The top surface of the inside of the guide bracket 30 or the bottom surface of the support tray 22 may be provided with a connection structure such as a roller, a bearing, or the like, so as to stably implement sliding movement in the state in which the support tray 22 and the guide bracket 30 contact each other.

In addition, the guide bracket 30 and the support tray 22 are separately provided with a locking apparatus, thereby maintaining the storage case 20 in a constrained state.

Figure 4:
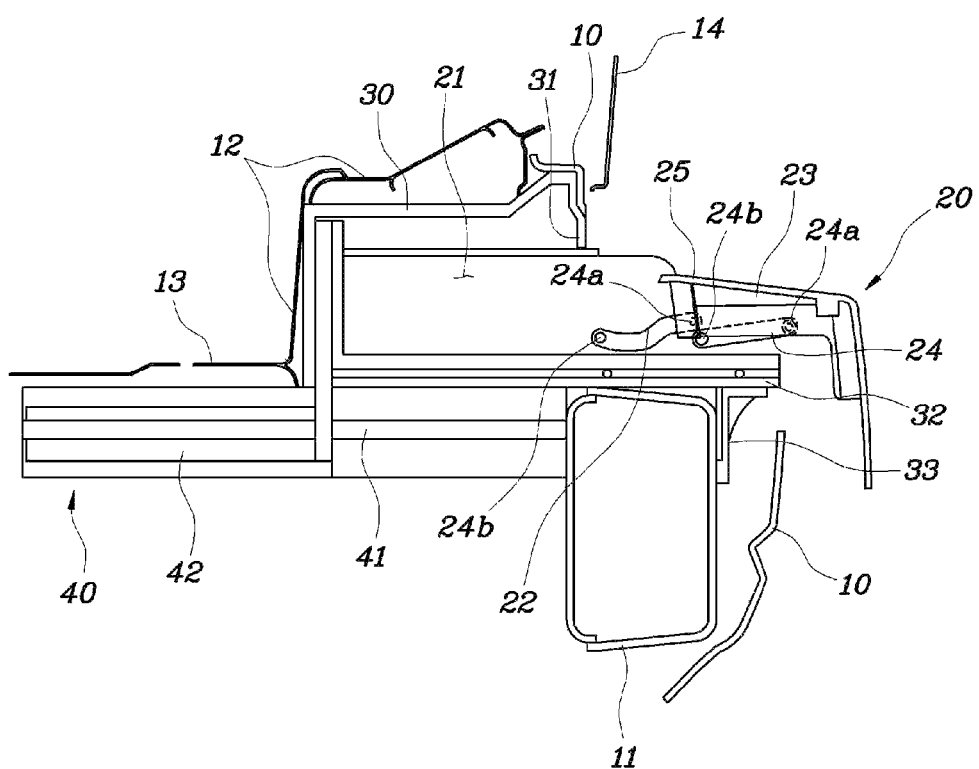
Figure 6:
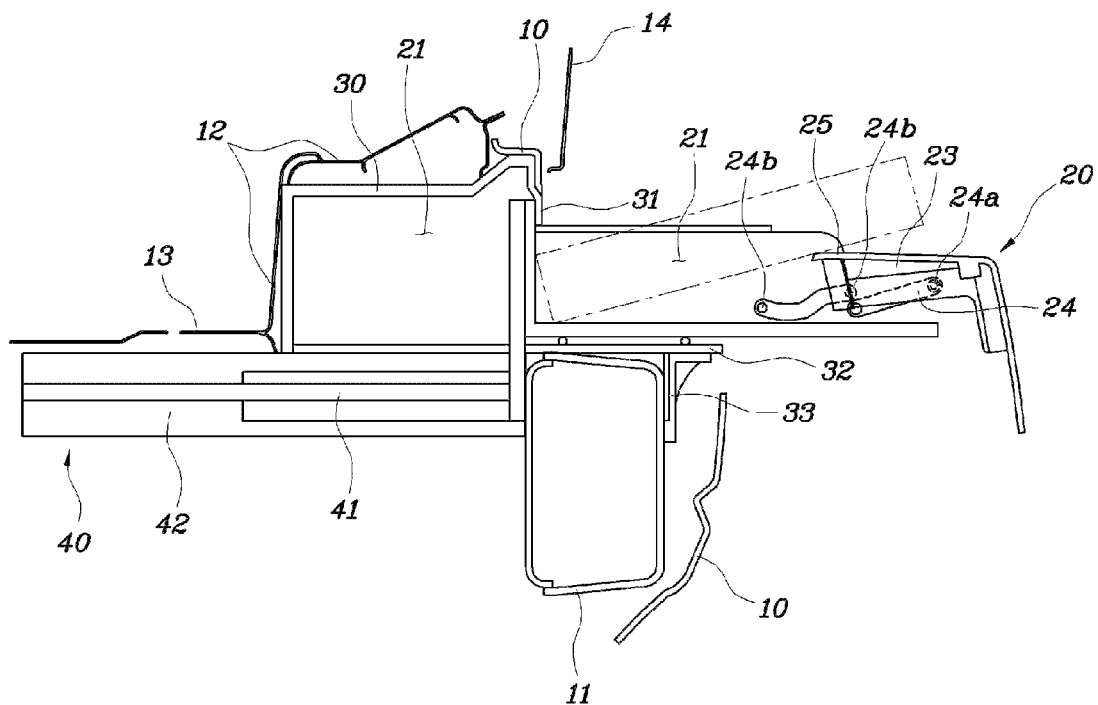
FIG. 6 is a diagram showing a structure in which the bumper door is opened, in the state in which the storage case of an exemplary storage apparatus according to the present invention is drawn-out.

As shown in FIGS. 4 and 6, one end of the guide bracket 30 according to various embodiments of the present invention is provided with a stopper part 31 to be bent downward, thereby supporting the inside of the storage case 20 at the time of drawing-out the storage case 20.

That is, when drawing-out the storage case 20, the top end vertically formed in front of the storage case 20 contacts the stopper part 31 and is supported thereto to prevent the storage case 20 from being excessively drawn-out beyond a defined range and prevent the storage case 20 from separating due to the rotation to the outside of the rear bumper 10 by the load of the storage case 20.

In addition, the other end of the guide bracket 30 is provided with a load support portion 32 to extend backward, thereby supporting the load of the storage case 20 at the time of drawing-out the storage case 20.

That is, the back beam 11 and the other end of the guide bracket 30 support the load of the storage case 20 when drawing-out the storage case 20. In this case, the load support portion 32 is formed so as to further extend in the drawing-out direction of the storage case 20 to secure the support rigidity in the vertical direction, thereby more firmly and stably supporting the load applied to the storage case.

Various embodiments of the present invention have a structure configured to further include a support bracket 33 mounted to be fixed to the bottom surface of the load support portion 32 and the rear surface of the back beam 11 so as to support the load of the storage case 20. In this case, the support bracket 33 is formed to have a cross section in a ¬-letter shape and thus, the support bracket 33 is formed to have a structure fixedly mounted to both of the rear surface of the back beam 11 and the bottom surface of the guide bracket 30, thereby more easily secure the support rigidity in the vertical direction.

Meanwhile, as shown in FIG. 3, according to various embodiments of the present invention, the inner space in front of the rear bumper 10 is provided with a rear floor panel 13, the rear floor panel 13 is provided with a guide rail mechanism 40, and the top portion of the guide rail mechanism 40 is mounted with the storage case 20 to be mounted above the back beam 11. In this case, the guide rail mechanism 40 may be an LM guide.

That is, the bottom portion of the rear floor panel 13 may be mounted with the guide rail 41 and may be coupled with a saddle 42 guided by the guide rail 41 so as to implement a linearly reciprocal movement. Meanwhile, the top portion of the saddle 42 is directly coupled with the storage case 20 or is coupled with the storage case 20 through a separate connection bracket so that the storage case 20 may be mounted above the back beam 11.

Therefore, the storage case 20 may penetrate into the inside of the vehicle or may be provided so as to be drawn-out and drawn-in to the top portion of the rear bumper 10 without interfering with the back beam 11, thereby optimizing the layout of the storage apparatus.

In addition, the saddle 42 or the separate connection bracket contacts the front surface of the back beam 11 and is supported thereto at the time of drawing-out the storage case 20, such that the saddle 42 or the connection bracket may serve as the stopper preventing the storage case 20 from being excessively drawn-out.

As set forth above, various embodiments of the present invention can maximize the article storage function by increasing the storage space in the vehicle by mounting the storage case having the storage space in the space provided above the rear bumper and supporting the storage case above the back beam to be drawn-out to the outside.

In addition, various embodiments of the present invention can greatly improve the value of commodities of the vehicle by rotating the bumper door downwardly through the link structure so as to the bumper door as the step or the bench at the time of opening the storage case or by using the articles while being put the articles on the opened bumper door, while configuring the top surface of the bumper door so as to have the predetermined width.

In addition, various embodiments of the present invention can optimize the layout of the storage apparatus capable of firmly supporting the load applied to the storage apparatus during the drawing-out and drawing-in of the storage case by simultaneously fixing the guide bracket to the rear end panel and the back beam and preventing the storage case from interfering with the back beam or intruding into the vehicle by mounting the storage case above the back beam.

Further, various embodiments of the present invention can further increase the storage space by using both of the storage space of the top surface of the support tray and the space on the top surface of the bumper door by rotating the bumper door downwardly in the state in which the storage case is drawn-out, thereby effectively loading the long articles.

For convenience in explanation and accurate definition in the appended claims, the terms front or rear, and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A storage apparatus for a vehicle, comprising:
   a rear bumper having a lower back beam;
   a storage case telescopically mounted in a space at an end of a rear floor panel above the rear bumper to be drawn-out to an open position in which a storage space of the storage case is supported by a top of the back beam; and a bumper door provided eccentrically-rotatable on an end of the storage case so as to open and close the storage case, the bumper door being formed so that an external portion coincides with an outer surface of the rear bumper.

2. The storage apparatus for a vehicle of claim 1, wherein the storage case includes:
a support tray defining the storage space and slidably movable while supported on the top of the back beam; and
a tray cover provided in the bumper door and rotatably mounted to the support tray to open and close the support tray.

3. The storage apparatus for a vehicle of claim 2, further comprising a plurality of link members having first ends rotatably coupled to both sides of the tray cover and second ends rotatably coupled to both sides of the support tray.

4. The storage apparatus for a vehicle of claim 2, wherein the tray cover is integrally coupled with the bumper door.

5. The storage apparatus for a vehicle of claim 2, wherein the bumper door rotated to the rear of the vehicle together with the tray cover is used as a step or a bench.

6. The storage apparatus for a vehicle of claim 1, further comprising a guide bracket provided in the top space of the rear bumper in the state in which a portion of the storage case is covered and supported and mounted so as to be supported to a rear end panel and the back beam.

7. A storage apparatus for a vehicle, comprising:
a rear bumper having a lower back beam;
a storage case telescopically mounted in a space at an end of a rear floor panel above the rear bumper to be drawn-out to an open position in which a storage space of the storage case is supported by a top of the back beam;
a bumper door provided eccentrically-rotatable on an end of the storage case so as to open and close the storage case, the bumper door being formed so that an external portion coincides with an outer surface of the rear bumper; and
a guide bracket provided in the top space of the rear bumper in the state in which a portion of the storage case is covered and supported and mounted so as to be supported to a rear end panel and the back beam;
wherein the bottom surface of the guide bracket is mounted to be seated to the top end of the back beam, the front surface of the guide bracket is mounted to be supported to the rear end panel, and the top portion of the guide bracket is mounted to be support to the top portion of the rear bumper.

8. A storage apparatus for a vehicle, comprising:
a rear bumper having a lower back beam;
a storage case telescopically mounted in a space at an end of a rear floor panel above the rear bumper to be drawn-out to an open position in which a storage space of the storage case is supported by a top of the back beam;
a bumper door provided eccentrically-rotatable on an end of the storage case so as to open and close the storage case, the bumper door being formed so that an external portion coincides with an outer surface of the rear bumper; and
a guide bracket provided in the top space of the rear bumper in the state in which a portion of the storage case is covered and supported and mounted so as to be supported to a rear end panel and the back beam;
wherein an end of the guide bracket is provided with a stopper part to be bent downward to support the inside of the storage case at the time of drawing-out the storage case.

9. The storage apparatus for a vehicle of claim 6, wherein an other end of the guide bracket is provided with a load support portion to extend backward so as to support the load of the storage case at the time of drawing-out the storage case.

10. The storage apparatus for a vehicle of claim 9, further comprising a support bracket mounted to be fixed to the bottom surface of the load support portion and the rear surface of the back beam so as to support the load of the storage case.

11. The storage apparatus for a vehicle of claim 1, wherein the inner space in front of the rear bumper is provided with the rear floor panel, the rear floor panel is provided with a guide rail mechanism, and the top portion of the guide rail mechanism is mounted with the storage case to be mounted above the back beam.

* * * * *